United States Patent [19]

Davis

[11] 3,955,896
[45] May 11, 1976

[54] SPIDER MACHINING APPARATUS

[75] Inventor: Dalton M. Davis, Palos Verdes Estates, Calif.

[73] Assignee: E-T Industries, Inc., Benicia, Calif.

[22] Filed: Mar. 10, 1975

[21] Appl. No.: 556,626

Related U.S. Application Data

[62] Division of Ser. No. 123,218, March 11, 1971, Pat. No. 3,891,343.

[52] U.S. Cl. ................................ 408/1 R; 408/42
[51] Int. Cl.² .......................................... B23B 35/00
[58] Field of Search .............. 408/1, 43, 44, 38, 45, 408/71, 42; 90/56 R, 11 C; 29/38 A, 38 B, 38 C

[56] References Cited
UNITED STATES PATENTS

| | | |
|---|---|---|
| 1,825,971 | 10/1931 | Muhl .................................. 408/45 |
| 2,051,720 | 8/1936 | Kingsbury ............................. 408/38 |
| 2,358,389 | 9/1944 | Ewart et al. ......................... 408/44 |
| 2,709,932 | 6/1955 | Grimes ............................. 90/56 R X |

*Primary Examiner*—Gil Weidenfeld
*Attorney, Agent, or Firm*—Alter and Weiss

[57] ABSTRACT

A machining apparatus to locate a plurality of the depressions within the periphery of a spider in a vehicle wheel assembly, the depressions being divided into a plurality of groups of depressions, the spider being fixedly positioned by its mounting holes upon an indexing plate, a plurality of separate drilling units to form the depressions, each drilling unit to form a particular depression within each depression group.

6 Claims, 5 Drawing Figures

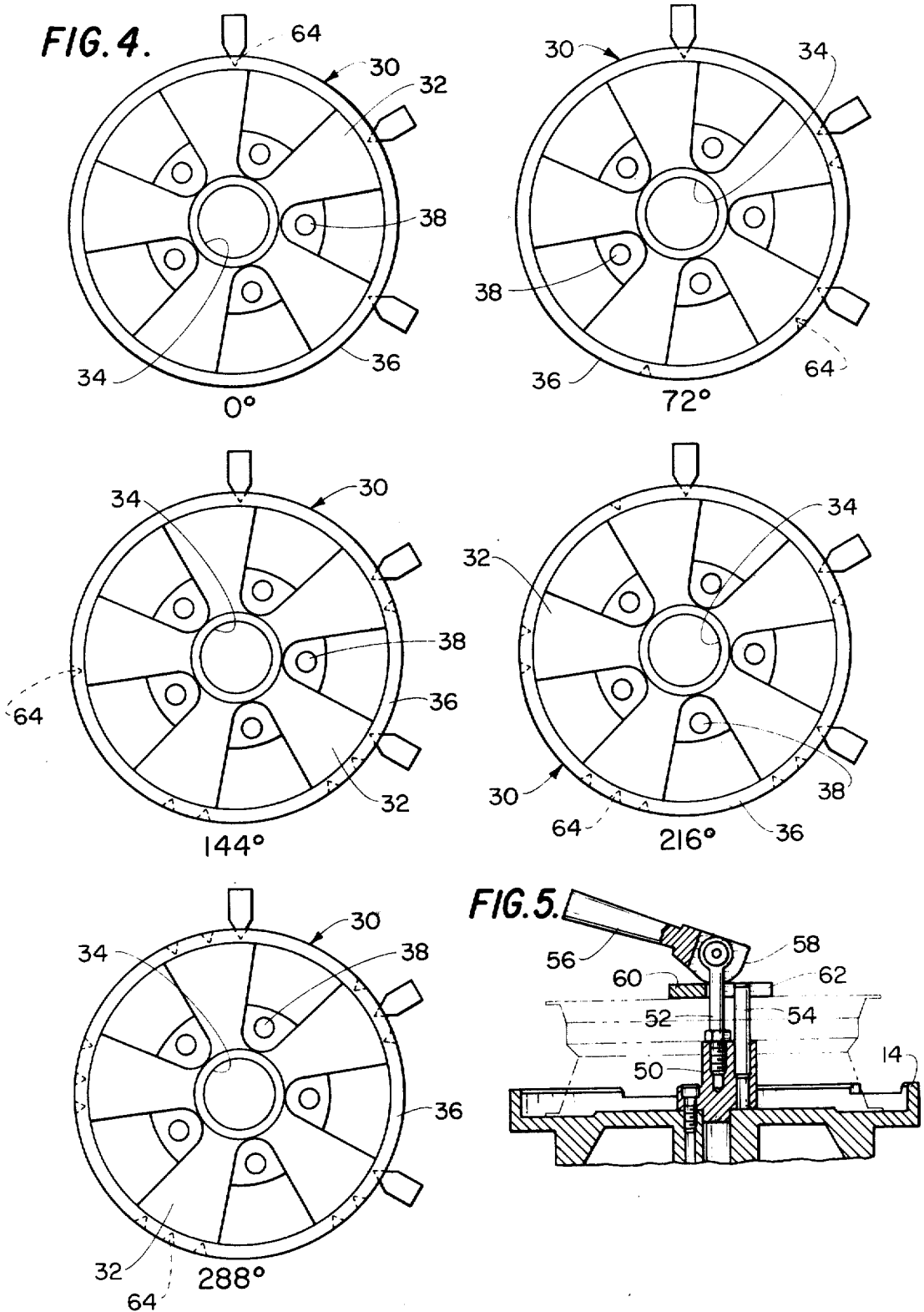

SPIDER MACHINING APPARATUS

This is a division of application Ser. No. 123,218, filed Mar 11, 1971, now U.S. Patent No. 3,891,343.

BACKGROUND OF THE INVENTION

The field of this invention relates to inflatable tire supporting structures and more particularly to an improved machining apparatus to assist in the manufacturing of the tire supporting structure.

It has been common practice for a number of years to mount the inflatable tire of a vehicle upon a steel rim, and then to secure the steel rim to the drum of the vehicle. Normally, such steel rims were formed as an integral unit in a rough cast form. In an effort to improve the spider section of the wheel (the section centrally located with respect to the rim), it has been common to employ the use of a hubcap which is designed to be ornamental and pleasing to the eye. A large number of different types of hubcaps of various designs have been employed in the past.

Within recent years it has been common to make ornamental the spider portion of the wheel itself, thereby eliminating the need for a hubcap. It has been found that if the spider is formed of a non-ferrous metal such as aluminum or magnesium, the spider is more receptive to styling by chrome plating than a steel spider. However, it has not been particularly easy to establish a strong, leakage free connection between the non-ferrous spider and the ferrous rim.

Most such rims are to support a tubeless tire wherein the rim must establish an airtight connection with the tire. It has been a known practice in the past to rivet the rim to the spider. As a result, it has been common that a non-perfect riveting causes the pressurized air within the tire to leak out past one or more of the rivets. Also, although a satisfactory rivet connection may be initially established, after a period of time it may loosen permitting air to leak from the tire.

In an effort to overcome the use of rivets, there have been numerous attempts as welding the spider to the rim. However, the welding of a ferrous metal to a non-ferrous metal is not easily accomplished even by the most skilled artisan. Further, the welding technique is inherently time consuming. The cost of manufacture of such wheel assemblies is substantially increased when using the welding technique.

SUMMARY OF THE INVENTION

The machining apparatus of the invention is to be employed to facilitate the securing of a non-ferrous spider within a ferrous rim of the inflatable tire wheel assembly. The spider is to include a central hub section from which extends a plurality of radial spokes. The free end of each of the radial spokes are integrally connected to an annular ring. A plurality of mounting holes are located adjacent the hub portion of the spider with a single mounting hole being located between adjacent spokes. The machining apparatus of this invention is designed to fixedly position the spider by means of the mounting holes upon an indexing plate. Pin means are to be positioned within apertures formed within the indexing plate with the pin means being adapted to cooperate with at least two (in number) of the mounting holes in the spider. The pin means is to be adjustable so as to cooperate with different diameter mounting hole arrangements within different types of spiders. A group of depressions is to be formed within the annular ring directly adjacent each of the spokes. A drilling unit is to be secured to the housing of the machining apparatus. There is to be the same number of drilling units that there are depressions within each of the groups. Each of the depressions are to be formed substantially cone shaped with the side walls of each of the depressions being formed substantially at a forty five degree angle with the periphery of the annular ring. Each drilling unit is to form a particular depression within each group. The indexing plate is adapted to rotate a spider a predetermined angle so as to result in the formation of each depression within each of the groups.

BRIEF DESCRIPTION OF THE DRAWINGS

FIG. 4 is a schematic view of the sequential movement of the indexing plate to clearly depict the depression forming arrangement; and FIG. 5 is a cross sectional view taken along line 5—5 of FIG. 1 clearly showing the handle arrangement to mount the spider upon the indexing plate.

DETAILED DESCRIPTION OF THE SHOWN EMBODIMENT

The machining apparatus of this invention is designed to be employed in conjunction with the subject matter described in Patent Application Ser. No. 93,724, filed Nov. 30, 1970, entitled VEHICLE WHEEL APPARATUS, by the inventor of the present application. Basically, the machining apparatus of this invention is to be employed to effect forming of the depressions prior to effecting the method and the apparatus of the aforesaid application. For a detailed explanation of the process and structure within which the apparatus of this invention is to be employed in conjunction, reference may be had to the aforementioned patent application Ser. No. 93,724.

Figure 1:
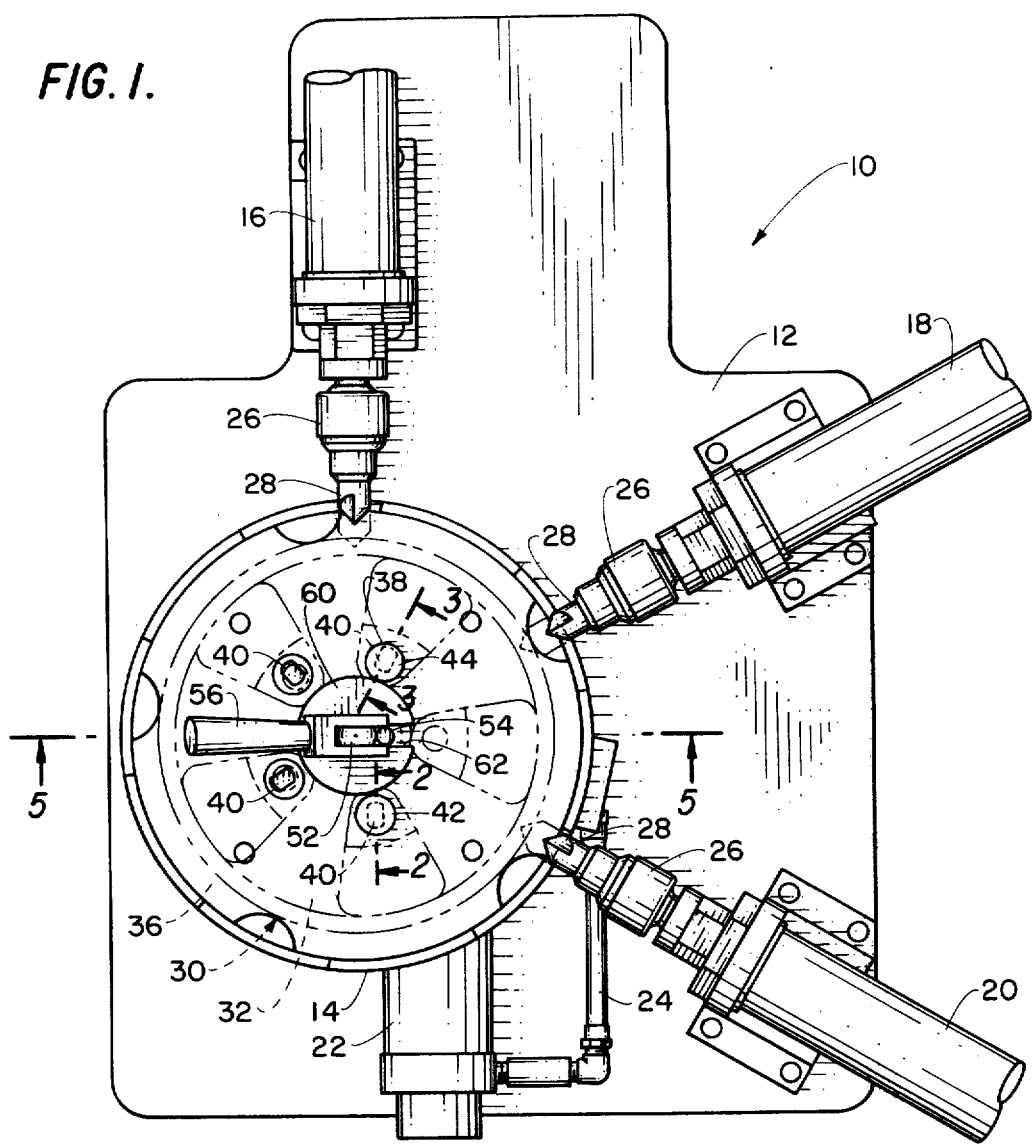
FIG. 1 is a plan view of the machining apparatus of this invention showing the apparatus in cooperation with a spider of a vehicle wheel assembly.
Figure 2:
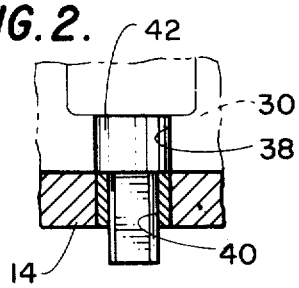
FIG. 2 is a fragmentary cross sectional view of a first pin to cooperate with a mounting hole of the spider taken along line 2—2 of FIG. 1.
Figure 3:
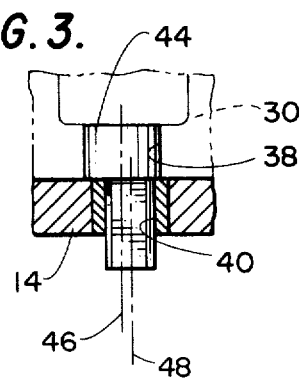
FIG. 3 is a fragmentary cross sectional view similar to FIG. 2 of a second pin cooperating with a second mounting hole in the spider taken along line 3—3 of FIG. 1.

Referring particularly to the drawings, there is shown in FIG. 1 the machining apparatus 10 of this invention basically including a main housing 12, an indexing plate 14, and a plurality of drilling units 16, 18 and 20. Each of the drilling units 16, 18 and 20 are fixedly mounted in a particular position upon the main housing 12. Also, the indexing plate 14 is mouned in a particular position upon the main housing 12.

The indexing plate 14 includes a mechanism (not shown) which effects rotational movement of the indexing plate 14 with respect to the main housing 12. Basically, the rotational movement is in annular increments such as seventy two degrees between increments. The mechanism within the indexing plate is designed so as to accurately effect this incremental movement of the indexing plate. The indexing plate 14 is rotated by means of a motor 22 which is to be operated by a source (not shown) of pressurized fluid being supplied through conduit 24. It is to be understood that although it is envisioned that the motor 22 will be driven pneumatically, the motor 22 could be driven hydraulically, electrically, or by any other means. The mechanism which is not shown to effect the incremental rotation of the indexing 14 is deemed to be conventional and readily available from several sources as a purchased item. It is to be understood that although it is desirable to employ a seventy two degree incremental movement of the indexing plate, it may be desirable to employ different incremental movements such as 90°, 60°or 120°.

Each of the drilling units 16, 18 and 20 include a motor (not shown), a chuck assembly 26 and a drilling bit 28. The drilling bit 28 through the chuck assembly 26 is to be rotated by means of the motor within its respective drilling unit. The motor within each of the drilling units 16, 18 and 20 is to be operated by means of a source of power such as a pressurized fluid from a source (not shown). However, it is to be understood that the source of power to operate the drilling units may be readily varied and could comprise electrical or hydraulic sources. The inventor of the present invention has found that it is particularly desirable to effect automatic actuation of the drilling units 16, 18 and 20 immediately after effecting the incremental movement of the indexing plate 14. This procedure is to be automatically effected a given number of times until the indexing plate 14 has been rotated a total of 360° (or one complete revolution). For this automatic actuation to take place with absolute accuracy and low maintenance of operation, pneumatic power and a switching assembly has been found to be most desirable. Such pneumatic switching assemblies are conventional and may be readily assembled by a person skilled in such assemblies. However, the inventor of this application does not wish to be specifically limited to the use of a pneumatic source and switching assemblies to effect automatic actuation of the apparatus 10 of this invention.

A spider 30 is to cooperate with the indexing plate 14 as shown in FIG. 1 of the drawings. The spider 30 is to include a plurality of spokes 32 which are equiangularly spaced from each other and extend radially from a hub aperture 34. The hub aperture 34 is to facilitate attachment of the spider 30 and its associated rim (not shown) to the drive drum of the vehicle such as an automobile. An annular element 36 is integrally connected to the free end of each of the spokes 32 and is concentrically disposed with respect to the central hub aperture 34. It is to be noted that the entire spider 30 would normally be formed of non-ferrous materials such as aluminum, magnesium, or alloys thereof. However, it is to be understood that the spider 30 could be readily manufactured from different materials such as ferrous materials.

Within the spider, located in between each of the spokes 32 and adjacent the hub aperture 34, is a mounting hole 38. It is to be noted that there are five in number of such mounting holes 38 formed within the spider 30. However, the number of the mounting holes 38 is to be considered to be a matter of choice or design. The mounting holes 38 are arranged concentrically about the central hub aperture 34. The mounting holes 38 are to cooperate with the lug bolts (not shown) upon the wheel drum (not shown) of the vehicle (not shown).

Formed within the indexing plate 14 are a plurality of openings 40. Each of the openings 40 are capable of cooperating with the lower end of a pin 42. The upper end of the pin 42 is adapted to cooperate in a tight fitting manner with a single mounting hole 38.

It is to be noted that the reason for a plurality of openings 40 is that the indexing plate 14 is adapted to cooperate with spiders 30 having different mounting hole 38 diameters. In other words, some spiders 30 have a mounting hole diameter of 4½ inches while others have 4¾ inch diameter, and yet other spiders may have a 5 inch mounting hole diameter.

It is desired to accurately position the spider 30 upon the indexing plate 14. For this reason, two such pins 42 will be employed within a set of openings 40 with each pin cooperating with a mounting hole 48 to fixedly position the spider 30 on the indexing plate 14. However, to limit the number of the openings 40, an eccentric pin 44 is employed. The eccentric pin 44 is formed so that the axis 46 of the upper portion of the pin 44 is displaced from the axis 48 of the lower portion of the pin 44. In actual practice, it is envisioned that the displacement will be in the amount of ¼ of an inch.

Let it be assumed that within the indexing plate 14 we have one opening 40 for the 4½ inch mounting hole diameter, another opening 40 for the 4¾ inch mounting hole diameter, and a third opening 40 which is to cooperate with a 5 inch mounting hole diameter. If it is desired to locate a 4½ inch mounting hole diameter spider upon the indexing plate 14, the operator then places the regular pin 42 in the 4½ inch diameter opening 40. The operator places the eccentric pin 44 in the 4¾ inch diameter opening 30 so that the head of the pin 44 is located nearest the hub aperture 34. As a result, because the head of the pin 44 is displaced ¼ inch from the lower portion of the pin 44, the head portion of the pin 44 will readily cooperate with a 4½ inch diameter mounting hole 38.

By rotating the same pin 44 180°, the pin 44 is then capable of cooperating with the 5 inch mounting hole diameter. In such an instance, the pin 42 would then be moved to the opening 40 which is designed to be employed for the 5 inch mounting hole diameter.

If it is desired to mount a 4¾ inch mounting hole diameter spider upon the indexing plate, pin 42 is to be located in the 4¾ inch opening 40 while the pin 44 may be employed in either the 4½ inch opening 40 or in the 5 inch opening 40. If the pin 44 is employed in the 4½ inch opening 40, it is located so that the head of the pin 44 is furtherest away from the hub aperture 34. If the pin 44 is located in the 5 inch opening, the opposite is true with the head of the pin being located nearest the hub aperture 34.

With the spider 30 in position upon the indexing plate 14, the hub 50 which is integrally connected to the indexing plate 14 extends within the hub aperture 34. A first pin 52 extends from the hub 50 and is fixedly secured thereto. A second pin 54 extends from the hub 50 and is fixedly secured thereto. A second pin 54 extends from the hub 50 and is also fixedly secured thereto. A handle 56 is privotally connected to the first pin 52. The handle 56 is a cam surface 58 formed thereon. A washer 60 having an elongated opening 62 is adapted to cooperate with both the first pin 52 and the second pin 54 so that both the first pin 52 and the second pin 54 extends within the opening 62.

With the handle 56 pivoted so as to be substantially perpendicular to the upper surface of the indexing plate 14, the spider 30 may be readily moved into and out of cooperation with the indexing plate 14. Once the spider is in cooperation with the indexing plate 14 and the mounting holes 38 of the spider are cooperating with the pins 42 and 44, the operator then positions the washer 60 so the pins 52 and 54 are located within the opening 62. The operator then pivots the handle 56 causing cam surface 58 to displace the washer 60 in a downward direction toward the spider 30. As a result, a force is established to tend to maintain the spider 30 in frictional contact with the indexing plate 14.

It will be assumed that the operator has located a spider 30 into cooperation with the indexing plate 14 and it is desired to form within the annular element 36 a plurality of inwardly extending, radially located depressions 64. With the spider 30 so located, the operator effects actuation of a control mechanism (not shown) which effects activation of the drilling units 16, 18 and 20. As a result, the drill bits 28 are rotated and are caused to move inwardly toward the spider 30. The amount of the inward movement of each of the drill bits 28 has been predetermined according to the desired depth of each of the depressions 64. It is to be noted that there are preferably three in number of such depressions 64 adjacent each of the spokes 32. Since there are five in number of such spokes, there are 15 such depressions 64 formed within the annular element 36. However, it is to be understood that the number of depressions 64 is to be strictly a matter of choice and design.

It is to be noted that the drilling unit 16 is so located so as to form the depression 64 on the right hand side of the spoke 32. The drilling unit 20 is to effect forming of a depression 64 on the left hand side of the spoke 32. The drilling unit 18 forms the depression 64 located centrally with respect to the spoke 32. As a result, upon the initial drilling movement after the locating of the spider 30, a total of three different depressions are formed adjacent three different spokes as shown in the zero degree position of FIG. 4 of the drawings.

After the drilling in the first position is completed, the drilling bits 28 are automatically retracted and then the control system (not shown) automatically rotates the indexing plate 14 to the 72° position. In this position, the drilling procedure is repeated forming three additional depressions 64. The procedure is again repeated at the 144° position, the 216° position, and finally at the 280° position. As can be seen from FIG. 4 of the drawings, upon the three depressions 64 being formed in the 288° position, the total number of depressions have been formed, a total of 15 in number, with three in number of depressions 64 being located adjacent each spoke 32.

It is to be understood that it is to be normally desirable to include a control system which automatically effects the forming of all fifteen depressions upon activation thereof. As a result, a minimum amount of manufacturing time is employed to form the depressions 64 as well as the depressions 64 being located with extremely accurately with a minimum amount of error.

The depressions 64 may assume any basic configuration. However, the inventor has found that if the walls of the depressions are located at substantially a 45° angle with respect to the outer surface of the annular element 50, best results are obtainable. The cross sectional configuration of each depression 64 is basically in the shape of a circle. The best way in which to form each of the depressions 64 is by employing the tip portion of a conventional drill bit 28. Although the 45° angle is described as being preferable, it has been found that satisfactory results can be achieved if the angle is anywhere between 23° to 45°.

What is claimed is:
1. A method for forming complete groups of depressions on the outer periphery of a vehicle wheel assembly having spokes extending from a center section to said outer periphery,
said method including the steps of:
rotating said wheel assembly in increments, each increment being equal to 360° divided by the number of said spokes;
simultaneously drilling a plurality of separate, spaced apart depressions within the outer periphery of said wheel assembly at each increment of said incremental rotation, each of said depressions being simultaneously drilled opposite adjacent ones of said spokes, the number of depressions made at each increment of rotation being equal to the number of depressions desired in each of said groups of depressions;
simultaneously drilling each of said depressions at a spacing less than the incremental distance of each of said increments by an angle equal to the space between said depressions in each of said groups; and
rotating said wheel assembly 360° minus the number of degrees of each increment of rotational movement, to obtain said complete groups of depressions on the outer periphery at each of said spokes.

2. The method of claim 1 wherein said wheel assembly has five spokes and wherein the number of depressions made at each increment of rotation is equal to three.

3. The method of claim 2 wherein the spacing between each of said depressions in a group is equal to 12°.

4. A method for forming a complete group of depressions on the outer periphery of a wheel assembly having spokes extending from the center section to the outer periphery of said wheel assembly,
the method including the steps of:
supporting said wheel assembly for incremental rotation;
simultaneously drilling a depression at at least three separate points in the outer periphery of the wheel, each of said points being spaced apart a distance slightly less than the angular distance of each increment of rotation;
rotating said wheel through the first increment of rotation;
simultaneously drilling a second three depressions at the at least three separate points;
rotating the wheel through a second increment equal to the first increment;
simultaneously drilling a third depression at the at least three separate points;
rotating the wheel through a third increment;
again simultaneously drilling the depressions at the at least three separate points;
rotating the wheel through a fourth increment; and
simultaneously drilling the depressions at the at least three separate points, whereby five complete groups of three depressions are made on the outer periphery of the vehicle wheel.

5. The method of claim 5 wherein each increment is equal to 72°.

6. The method of claim 4 wherein the distance apart between each of the points of drilling the depression is 60°.

* * * * *